(12) United States Patent
Noguchi et al.

(10) Patent No.: US 10,001,651 B2
(45) Date of Patent: Jun. 19, 2018

(54) DISPLAY DEVICE AND LIGHT GUIDE DEVICE

(71) Applicant: SEIKO EPSON CORPORATION, Tokyo (JP)

(72) Inventors: Toshiyuki Noguchi, Fujimi-machi (JP); Masatoshi Yonekubo, Hara-mura (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days. days.

(21) Appl. No.: 15/437,856

(22) Filed: Feb. 21, 2017

(65) Prior Publication Data

US 2017/0261751 A1 Sep. 14, 2017

(30) Foreign Application Priority Data

Mar. 14, 2016 (JP) .................. 2016-049266

(51) Int. Cl.
*G02B 27/01* (2006.01)
*G02B 5/18* (2006.01)
*G02B 5/32* (2006.01)

(52) U.S. Cl.
CPC ........ *G02B 27/0172* (2013.01); *G02B 5/1842* (2013.01); *G02B 5/1861* (2013.01); *G02B 5/32* (2013.01); *G02B 27/0103* (2013.01); *G02B 2027/011* (2013.01); *G02B 2027/0105* (2013.01); *G02B 2027/0116* (2013.01);
(Continued)

(58) Field of Classification Search
CPC .... G02B 27/01; G02B 5/1842; G02B 5/1861; G02B 27/0172; G02B 5/32; G02B 27/0103; G02B 5/18
See application file for complete search history.

(56) References Cited

U.S. PATENT DOCUMENTS

2006/0228073 A1 10/2006 Mukawa et al.
2012/0038959 A1 2/2012 Ciaudelli et al.
(Continued)

FOREIGN PATENT DOCUMENTS

| EP | 0 526 067 A2 | 2/1993 |
| JP | 2000-338847 A | 12/2000 |
| JP | 2016-109923 A | 6/2016 |

OTHER PUBLICATIONS

Aug. 29, 2017 Extended Search Report issued in European Patent Application No. 17160957.1.

*Primary Examiner* — Jennifer L. Doak
(74) *Attorney, Agent, or Firm* — Oliff PLC

(57) ABSTRACT

A display device includes a first diffraction element configured to diffract image light and a second diffraction element disposed on an optical path between a light source and the first diffraction element. The first and the second diffraction element emit light beams that have highest diffraction efficiencies in one direction when a single wave light enters from directions of normals. If the sum of the number of reflections of light and the number of times of intermediate image generation between the second diffraction element and the first diffraction element is an even number, in the first and the second diffraction element, the directions of the diffraction light having the highest diffraction efficiencies are output when light enters from the directions of the normals are the same with respect to the directions of the normals to the incident planes. If the sum is an odd number, the directions are opposite.

9 Claims, 10 Drawing Sheets

(52) U.S. Cl.
CPC ................ *G02B 2027/0147* (2013.01); *G02B 2027/0174* (2013.01)

(56) References Cited

U.S. PATENT DOCUMENTS

2013/0222384 A1* 8/2013 Futterer .................. G02B 5/32
 345/426
2016/0161755 A1 6/2016 Yonekubo et al.

* cited by examiner

FIG. 12

| THE NUMBER OF REFLECTIONS 1 | SECOND EMBODIMENT | SECOND COMPARATIVE EXAMPLE |
|---|---|---|
| LIGHT ENTERS SECOND DIFFRACTION ELEMENT 35 FROM NORMAL DIRECTION | (a) ○ | (c) × |
| LIGHT ENTERS SECOND DIFFRACTION ELEMENT 35 FROM OBLIQUE DIRECTION | (b) ○ | (d) × |

DISPLAY DEVICE AND LIGHT GUIDE DEVICE

BACKGROUND

1. Technical Field

The present disclosure relates to a display device and a light guide device.

2. Related Art

Devices that use diffraction elements such as holographic elements include, for example, hologram recording and playback devices, and display devices that guide image light by using diffraction elements so as to enter the eyes of a user. In holographic elements, the pitches of interference patterns are optimized so as to obtain the highest diffraction efficiencies at predetermined wavelengths. As a light source, for example, a semiconductor laser may be used. However, even if a semiconductor laser operates in a single mode, the laser beam has a certain spectrum width, and light beams of wavelengths other than a predetermined wavelength may affect the resolution. Furthermore, wavelengths of light emitted from a semiconductor laser may vary due to ambient temperatures and other factors, and such variations may also affect the resolution. To solve the problem, for example, JP-A-2000-338847 proposes a structure in which a holographic element that absorbs wavelengths other than a predetermined wavelength is provided in a prior stage of a diffraction element such as a holographic element.

If optical components such as a mirror and a lens are disposed between two diffraction elements to reduce the size of the device, increase the degree of freedom of design, and correct various aberrations, depending on the directions of the two diffraction elements, beams of light having wavelengths other than a predetermined wavelength may become incident on positions notably beyond the original target point, and such deviation may affect the resolution.

SUMMARY

An advantage of some aspects of the embodiment is that a display device and a light guide device capable of reducing a decrease in resolution and the like due to variations in wavelengths of light emitted from a light source are provided.

To solve the above-mentioned problem, a display device according to an aspect of the embodiment includes an image light generation device configured to output an image light, a first diffraction element configured to diffract the image light that has entered a first incident plane such that the image light is directed to an eye of an observer and a second diffraction element disposed on an optical path between the image light generation device and the first diffraction element, the second diffraction element being configured to diffract the image light that has entered a second incident plane such that the image light is directed to the first diffraction element. The first diffraction element has highest diffraction efficiency in a first direction when light enters from a direction of a normal to the first incident plane, the second diffraction element has highest diffraction efficiency in a second direction when light enters from a direction of a normal to the second incident plane, the first diffraction element and the second diffraction element are disposed such that, if the sum of the number of reflections of light and the number of times of intermediate image generation between the second diffraction element and the first diffraction element is an even number, when viewed from direction of normal to virtual plane that include a normal to the first incident plane and a normal to the second incident plane, the direction of the first direction with respect to the direction of the normal to the first incident plane and the direction of the second direction with respect to the direction of the normal to the second incident plane are the same as each other, and the first diffraction element and the second diffraction element are disposed such that, if the sum of the number of reflections of light and the number of times of intermediate image generation between the second diffraction element and the first diffraction element is an odd number, when viewed from the direction of the normal to the virtual plane that include the normal to the first incident plane and the normal to the second incident plane, the direction of the first direction with respect to the direction of the normal to the first incident plane and the direction of the second direction with respect to the direction of the normal to the second incident plane are different from each other.

A light guide device according to an aspect of the embodiment includes a first diffraction element configured to diffract light that has been emitted from a light source and that has entered a first incident plane, and a second diffraction element disposed on an optical path between the light source and the first diffraction element, the second diffraction element being configured to diffract the light that has entered a second incident plane such that the image light is directed to the first diffraction element. The first diffraction element has highest diffraction efficiency in a first direction when light enters from a direction of a normal to the first incident plane, the second diffraction element has highest diffraction efficiency in a second direction when light enters from a direction of a normal to the second incident plane, the first diffraction element and the second diffraction element are disposed such that, if the sum of the number of reflections of light and the number of times of intermediate image generation between the second diffraction element and the first diffraction element is an even number, when viewed from direction of normal to virtual plane that include a normal to the first incident plane and a normal to the second incident plane, the direction of the first direction with respect to the direction of the normal to the first incident plane and the direction of the second direction with respect to the direction of the normal to the second incident plane are the same as each other, and the first diffraction element and the second diffraction element are disposed such that, if the sum of the number of reflections of light and the number of times of intermediate image generation between the second diffraction element and the first diffraction element is an odd number, when viewed from the direction of the normal to the virtual plane that include the normal to the first incident plane and the normal to the second incident plane, the direction of the first direction with respect to the direction of the normal to the first incident plane and the direction of the second direction with respect to the direction of the normal to the second incident plane are different from each other.

According to some aspects of the embodiment, a first diffraction element is configured to diffract image light emitted from an image light generation device to enter an eye of an observer, and a second diffraction element is disposed on an optical path between a light source of the image light generation device and the first diffraction element to absorb wavelengths other than a predetermined wavelength. The first diffraction element and the second diffraction element may be a holographic element or a blazed holographic diffraction element, and the first diffraction element and the second diffraction element each output diffracted light of highest diffraction efficiency in one direction when a light beam enters from a direction of a normal.

With this structure, improper alignment of the first diffraction element and the second diffraction element causes a failure in absorption of wavelengths other than a predetermined wavelength and results in a decrease in resolution due to the variations in the wavelengths. According to some aspects of the embodiment, if the sum of the number of reflections of light and the number of times of intermediate image generation between the second diffraction element and the first diffraction element is an even number, the first diffraction element and the second diffraction element are disposed such that, when light enters from a direction of a normal to the first diffraction element and a direction of a normal to the second diffraction element, the sides toward which diffraction light beams that have the highest diffraction efficiencies are output are the same with respect to the directions of the normals to the incident planes. Accordingly, variations in the wavelengths of the light emitted from a light source can be canceled between the first diffraction element and the second diffraction element. In contrast, if the sum of the number of reflections of light and the number of times of intermediate image generation between the second diffraction element and the first diffraction element is an odd number, the first diffraction element and the second diffraction element are disposed such that, when light enters from a direction of a normal to the first diffraction element and a direction of a normal to the second diffraction element, the sides toward which diffraction light beams that have the highest diffraction efficiencies are output are opposite with respect to the directions of the normals to the incident planes. Accordingly, variations in the wavelengths of the light emitted from a light source can be canceled between the first diffraction element and the second diffraction element. Consequently, a decrease in resolution or the like due to variations in the wavelengths of light emitted from a light source can be reduced.

According to an aspect of the embodiment, the first diffraction element and the second diffraction element may be reflective holographic elements. According to an aspect of the embodiment, the first diffraction element and the second diffraction element may be reflective volume holographic elements.

According to an aspect of the embodiment, the first diffraction element and the second diffraction element may have a plurality of interference fringes linearly extending parallel to each other. With this structure, plane waves can be used.

According to an aspect of the embodiment, the first diffraction element and the second diffraction element may have a plurality of curved interference fringes extending parallel to each other. With this structure, spherical waves can be used.

According to an aspect of the embodiment, the first diffraction element and the second diffraction element may have a plurality of kinds of interference fringes of different pitches.

BRIEF DESCRIPTION OF THE DRAWINGS

The embodiment will be described with reference to the accompanying drawings, wherein like numbers reference like elements.

FIG. 12 illustrates light beams in the light guide device according to the second embodiment and the second comparative example of the embodiment.

DESCRIPTION OF EXEMPLARY EMBODIMENTS

Hereinafter, embodiments will be described. In the description below, the up-down direction is an X direction, a lateral direction is a Y direction, and a front-back direction is a Z direction, and X, Y, and Z are used to denote the up-down direction, the lateral direction, and the front-back direction, respectively.

Example of Display Device Structure

Figure 1:
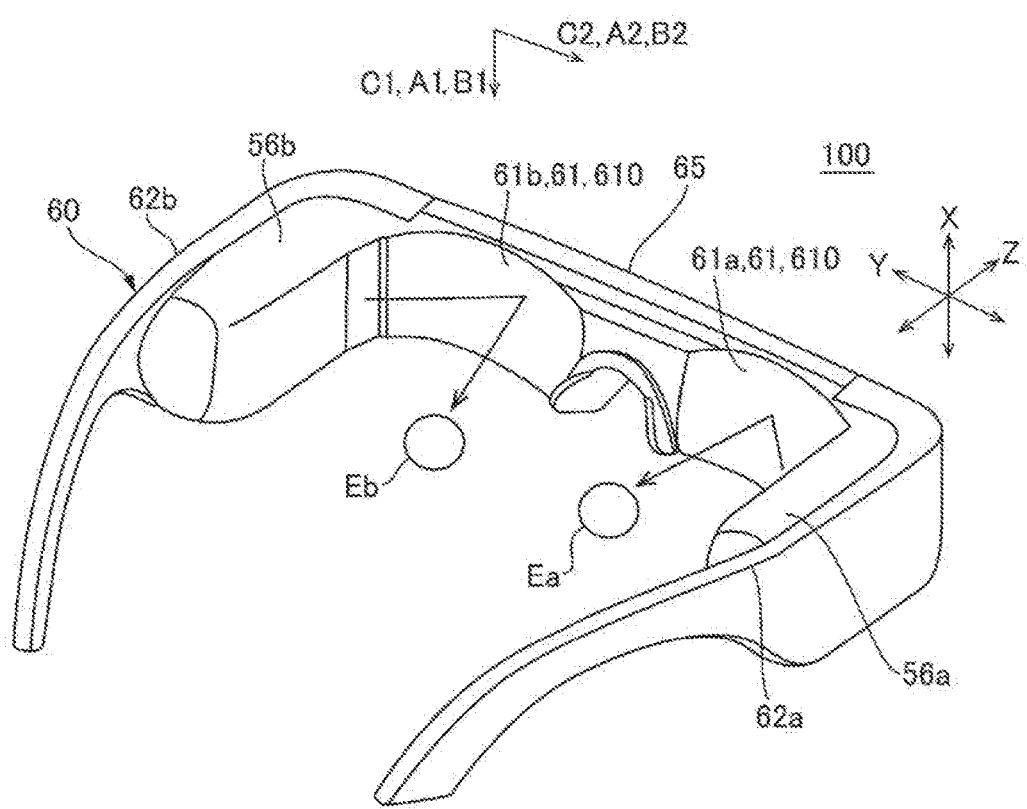
FIG. 1 an external view of a display device according to an aspect of the present embodiment.
Figure 2:
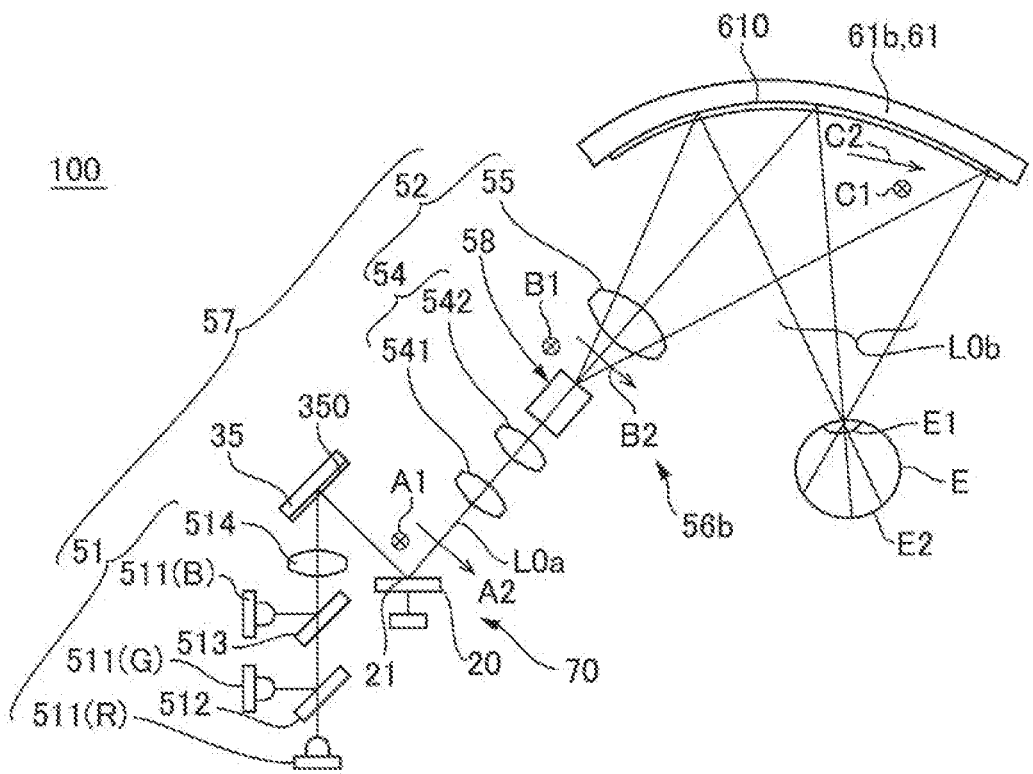
FIG. 2 illustrates an optical system of the display device according to an aspect of the embodiment.

FIG. 1 an external view of a display device 100 according to an aspect of the present embodiment. FIG. 2 illustrates an optical system of the display device 100 according to an aspect of the embodiment. In FIG. 1, the display device 100 is a head-mounted display device and includes a right-eye image light generation device 56a that emits a laser beam as a light source, a right-eye deflection member 61a that deflects the image light emitted from the right-eye image light generation device 56a toward a right eye Ea of an observer M, a left-eye image light generation device 56b that emits a laser beam as a light source, a left-eye deflection member 61b that deflects the image light emitted from the left-eye image light generation device 56b to a left eye Eb of the observer M. For example, the display device 100 has a shape similar to the shape of spectacles. Specifically, the display device 100 includes a frame 60 that supports the right-eye image light generation device 56a, the right-eye deflection member 61a, the left-eye image light generation device 56b, and the left-eye deflection member 61b. The frame 60 is mounted on the head of the observer. The frame 60 includes a front section 65 that supports the right-eye deflection member 61a and the left-eye deflection member 61b. The right-eye image light generation device 56a is disposed on a right temple 62a and the left-eye image light generation device 56b is disposed on a left temple 62b in the frame 60. A first diffraction element 61, which will be described below, is provided in the right-eye deflection member 61a and the left-eye deflection member 61b.

The right-eye image light generation device 56a and the left-eye image light generation device 56b have similar basic structures, and accordingly, in FIG. 2, only the structure of the left-eye image light generation device 56b is described, and the description of the right-eye image light generation device 56a is omitted. As illustrated in FIG. 2, the left-eye image light generation device 56b includes a light source section 51 that emits a beam of light for displaying an image, a scanning optical system 20 that has a scanning mirror 21 that scans the beam of light emitted from the light source section 51 to form an image, and an optical system 52 that outputs a beam of light L0a scanned by the scanning optical system 20 to the left-eye deflection member 61b. In this aspect, in the optical system 52, a relay lens system 54 that includes lenses 541 and 542, and a projection lens system 55 are disposed in this order from the scanning optical system 20 toward the left-eye deflection member 61b. In the optical system 52, a beam diameter expanding element 58 is disposed. The beam diameter expanding element 58 expands the light beam output from the scanning optical system 20 in at least one direction of a first expansion direction B1 that corresponds to a first scanning direction A1 (first incident direction C1) and a second expansion direction B2 that corresponds to a second scanning direction A2 (second incident direction C2).

The light source section 51 emits source light that has not optically been modulated or modulated light that has been optically modulated. In this aspect, the light source section 51 serves as a modulated light emitting section that emits optically modulated light. More specifically, the light source section 51 includes, as a light source, a red laser device 511(R) that emits red light (R), a green laser device 511(G) that emits green light (G), and a blue laser device 511 (B) that emits blue light (B), and also includes two half mirrors 512 and 513, which combine the optical paths of these laser devices, and a collimator lens 514. The red laser device 511 (R), the green laser device 511(G), and the blue laser device 511(B) are semiconductor lasers that emit beams of light that are modulated to have light intensities corresponding to respective dots of an image to be displayed under control of a controller (not illustrated).

A scanning optical system 20 scans incident light in the first scanning direction A1, and the second scanning direction A2 that intersects the first scanning direction A1 to generate image light L0b. Consequently, in this aspect, an image light generation device 70 includes the light source section 51 and the scanning optical system 20. The scanning optical system 20 and the left-eye deflection member 61b serve as a light guide device 57. The scanning optical system 20 operates under the control of a controller (not illustrated). The scanning optical system 20 can be implemented, for example, by a micromirror device manufactured using a silicon substrate or the like by microelectromechanical systems (MEMS) technology.

The image light L0b emitted from the scanning optical system 20 in the image light generation device 70 is projected toward the left-eye deflection member 61b via the relay lens system 54 and the projection lens system 55. In this aspect, the display device 100 is a retinal-scanning-type projection display device. The image light L0b emitted by the scanning optical system 20 in the first scanning direction A1 and the second scanning direction A2, which intersects the first scanning direction A1, is deflected by the left-eye deflection member 61b (diffraction element 61) in a first incident direction C1 that corresponds to the first scanning direction A1 and a second incident direction C2 that corresponds to the second scanning direction A2. The image light L0b reaches a retina E2 through a pupil E1 of a left eye Eb, and thereby the observer M recognizes the image.

In this aspect, the left-eye deflection member 61b is provided with the first diffraction element 61 that has a reflective volume holographic element 610. The reflective volume holographic element 610 is a partially reflective diffractive optical element, and the right-eye deflection member 61a and the left-eye deflection member 61b are partially transmissive reflective combiners. Accordingly, external light also enters the left eye Eb via the left-eye deflection member 61b (combiner), and the user can recognize a superimposed image consisting of the image light L0a in the display device 100 and the external light (background). The first diffraction element 61 has a concave curved surface facing the eye E of the observer, and this structure enables efficient gathering of the image light L0a and propagation toward the eye E of the observer.

Structure of the First Diffraction Element 61

Figure 3:
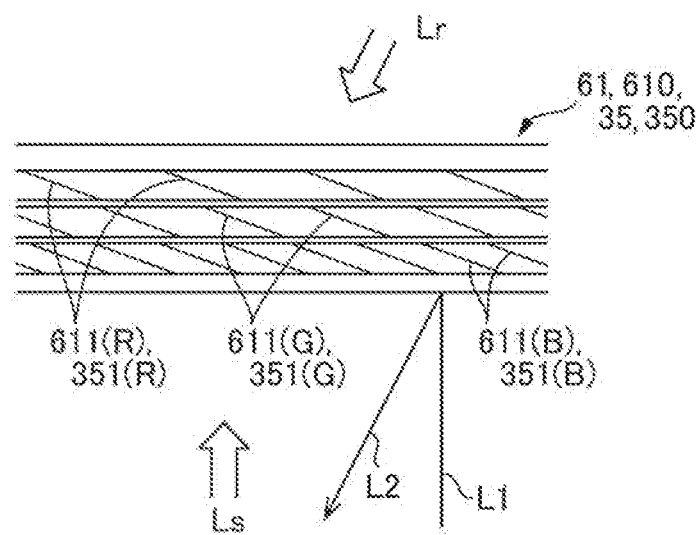
FIG. 3 illustrates a first diffraction element and a second diffraction element used in a display device according to an aspect of the embodiment.
Figure 4:
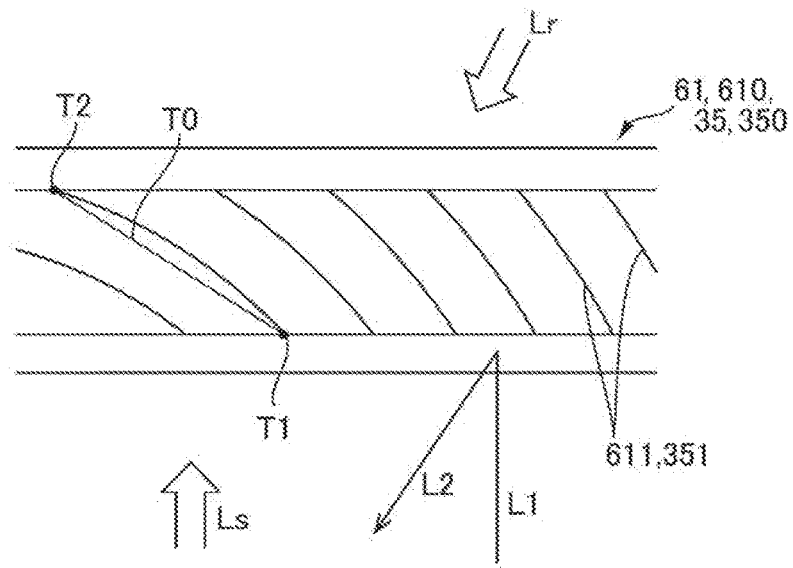
FIG. 4 illustrates a first diffraction element and a second diffraction element for spherical waves.

FIG. 3 illustrates the first diffraction element 61 and a second diffraction element 35 used in the display device 100 according to an aspect of the embodiment. FIG. 4 illustrates the first diffraction element 61 and the second diffraction element 35 for spherical waves. In this aspect, the red light (R), the green light (G), and the blue light (B) enter the first diffraction element 61, and the first diffraction element 61 diffracts and outputs the light of respective colors in predetermined directions. Accordingly, as schematically illustrated in FIG. 3, the first diffraction element 61 has first interference fringes 611 (R) that have a pitch corresponding to the wavelength of the red light (R), second interference fringes 611 (G) that have a pitch corresponding to the wavelength of the green light (G), and third interference fringes 611 (B) that have a pitch corresponding to the wavelength of the blue light (B), the interference fringes being layered in the thickness direction. These interference fringes 611 (the first interference fringes 611 (R), the second interference fringes 611 (G), and the third interference fringes 611 (B)) are recorded in respective hologram photosensitive layers as variations in refractive indexes, variations in transmittances, and variations in shapes such as the concave-convex patterns. These interference fringes 611 are inclined in one direction with respect to the incident surface of the first diffraction element 61. Accordingly, the first diffraction element 61 emits the diffraction light L2 that has the highest diffraction efficiency in one direction when a light beam L1 of a single wavelength enters from a direction of a normal. The interference fringes 611 can be produced by interference exposure of the holographic photosensitive layers to reference light Lr and object light Ls. If the object light Ls is a plane wave, a plurality of interference fringes 611 are produced in a linearly parallel manner. In FIG. 3, the first interference fringes 611 (R), the second interference fringes 611 (G), and the third interference fringes 611 (B) are formed in different layers, however, a plurality of types of interference fringes may be formed in a single layer. In such a case, the plurality of types of interference fringes are recorded so as to intersect each other.

If the light that enters the first diffraction element 61 is a spherical wave, to perform interference exposure, for example, a spherical wave is used as the object light Ls. In such a case, a plurality of curved interference fringes 611 are produced parallel to each other as schematically illustrated in FIG. 4. If the fringes 611 are inclined in one direction with respect to the incident surface of the first diffraction element

61. Accordingly, the first diffraction element 61 emits the diffraction light L2 of the spherical wave that has highest diffraction efficiency in one direction when the light beam L1 of the spherical wave having a single wavelength enters from a direction of a normal. In such a case, the "inclination direction" can be defined as, for example, an inclination of a line T0 that connects both ends T1 and T2 of an interference fringe 611. In the case of the spherical wave, "the incident direction and the output direction" can be defined as directions extending from the wave source in directions orthogonal to the plane since the spherical surface becomes substantially equivalent to a plane at a location separated from the wave source.

If the first diffraction element 61 is a reflective diffraction element, the first diffraction element 61 may be a surface-relief diffraction element (blazed grating) that has a profile of sawtooth grooves, a surface-relief holographic element (blazed holographic grating) formed by combining a holographic element and a surface-relief diffraction element (blazed holographic grating), or the like. Any of these elements can output diffracted light of highest diffraction efficiency in one direction when a light beam enters from a direction of a normal.

Structure of the Second Diffraction Element 35 for Wavelength Variation Correction In the display device 100 (the left-eye image light generation device 56b) according to this aspect, when an incident light beam of a predetermined wavelength enters, the first diffraction element 61 diffracts the incident light beam and outputs the light in a predetermined direction. However, even if lasers such as the red laser device 511 (R), the green laser device 511(G), and the blue laser device 511 (B) emit light in a single mode, the light emitted from a semiconductor laser has a certain spectrum width and includes light having wavelengths different from the predetermined wavelength. Furthermore, in some cases, the red laser device 511 (R), the green laser device 511(G), and the blue laser device 511 (B) are affected by ambient temperatures or other factors and emit light having various wavelengths. In such a case, among the incident light beams, the first diffraction element 61 diffracts the light beams different from the predetermined wavelength in various diffraction directions (output directions), and these variations may result in a decrease in the resolution. To deal with this problem, the display device 100 and the light guide device 57 according to this aspect are provided with the second diffraction element 35 on the optical path from the light source section 51 of the image light generation device 70 to the first diffraction element 61. In this aspect, the second diffraction element 35 includes a reflective volume holographic element 350.

The red light (R), the green light (G), and the blue light (B) enter the second diffraction element 35, and the second diffraction element 35 diffracts and outputs the light of respective colors in predetermined directions. Accordingly, as schematically illustrated in FIG. 3, similarly to the first diffraction element 61, the second diffraction element 35 has first interference fringes 351 (R) that have a pitch corresponding to the wavelength of the red light (R), second interference fringes 351 (G) that have a pitch corresponding to the wavelength of the green light (G), and third interference fringes 351 (B) that have a pitch corresponding to the wavelength of the blue light (B), the interference fringes being layered in the thickness direction. These interference fringes 351 (the first interference fringes 351 (R), the second interference fringes 351 (G), and the third interference fringes 351 (B)) are recorded in respective hologram photosensitive layers as variations in refractive indexes, variations in transmittances, and variations in shapes such as the concave-convex patterns, similarly to the interface fringes 611. These interference fringes 351 are inclined in one direction with respect to the incident surface of the first diffraction element 61. Accordingly, similarly to the first diffraction element 61, the second diffraction element 35 emits diffraction light L2 that has the highest diffraction efficiency in one direction when a light beam L1 of a single wavelength enters from a direction of a normal. The interference fringes 351 are produced by interference exposure of the holographic photosensitive layers to the reference light Lr and the object light Ls, similarly to the interference fringes 611. If the object light Ls is a plane wave, a plurality of interference fringes 351 are produced in a linearly parallel manner. In the second diffraction element 35, similarly to the first diffraction element 61, in some cases, a plurality of interference fringes are produced in a single layer.

If the light that enters the second diffraction element 35 is a spherical wave, to perform interference exposure, a spherical wave is used as the object light Ls. In such a case, curved interference fringes 351 are produced as schematically illustrated in FIG. 4. If the interference fringes 351 are curved, the interference fringes 351 are inclined in one direction with respect to the incident surface of the second diffraction element 35. Accordingly, the second diffraction element 35 emits the diffraction light L2 of the spherical wave that has highest diffraction efficiency in one direction when the light beam L1 of the spherical wave having the single wavelength enters from the direction of the normal. In such a case, the "inclination direction" of the interference fringe 351 can be defined as, for example, an inclination of a line T0 that connects both ends T1 and T2 of the interference fringe 351. In the case of the spherical wave, "the incident direction and the output direction" can be defined as directions extending from the wave source in directions orthogonal to a plane since the spherical surface becomes substantially equivalent to a plane at a location separated from the wave source.

Since the second diffraction element 35 is provided to reduce the variations in the wavelengths in the first diffraction element 61, the pitches of the interference fringes 351 (the first interference fringes 351 (R), the second interference fringes 351 (G), and the third interference fringes 351 (B)) of the second diffraction element 35 are the same as those of the interference fringes 611 (the first interference fringes 611 (R), the second interference fringes 611 (G), and the third interference fringes 611 (B)) of the first diffraction element 61 respectively. The pitches of the interference fringes 351 and 611 are the same in the in-plane direction in the first diffraction element 61 and the second diffraction element 35. It should be noted that in the first diffraction element 61, the pitches of the interference fringes 611 may be different in the in-plane direction. For example, in the first diffraction element 61, angles for diffracting the image light L0b so as to let the image light L0b enter the eye of the observer are different in the central part and in the end parts, and accordingly, the pitches of the interference fringes 611 may be changed differently to correspond to the difference in the angles. In such a case, it is preferable that the pitches of the interference fringes 611 in the first diffraction element 61 be within the range between half to twice the interference fringes 351 of the second diffraction element 35.

If the second diffraction element 35 is a reflective diffraction element, the second diffraction element 35 may be a surface-relief diffraction element, a surface-relief holographic element (blazed holographic grating), or the like. Any of these elements can output diffraction light of highest diffraction efficiency in one direction when a light beam enters from a direction of a normal.

First Embodiment of the Light Guide Device 57

Figure 5:
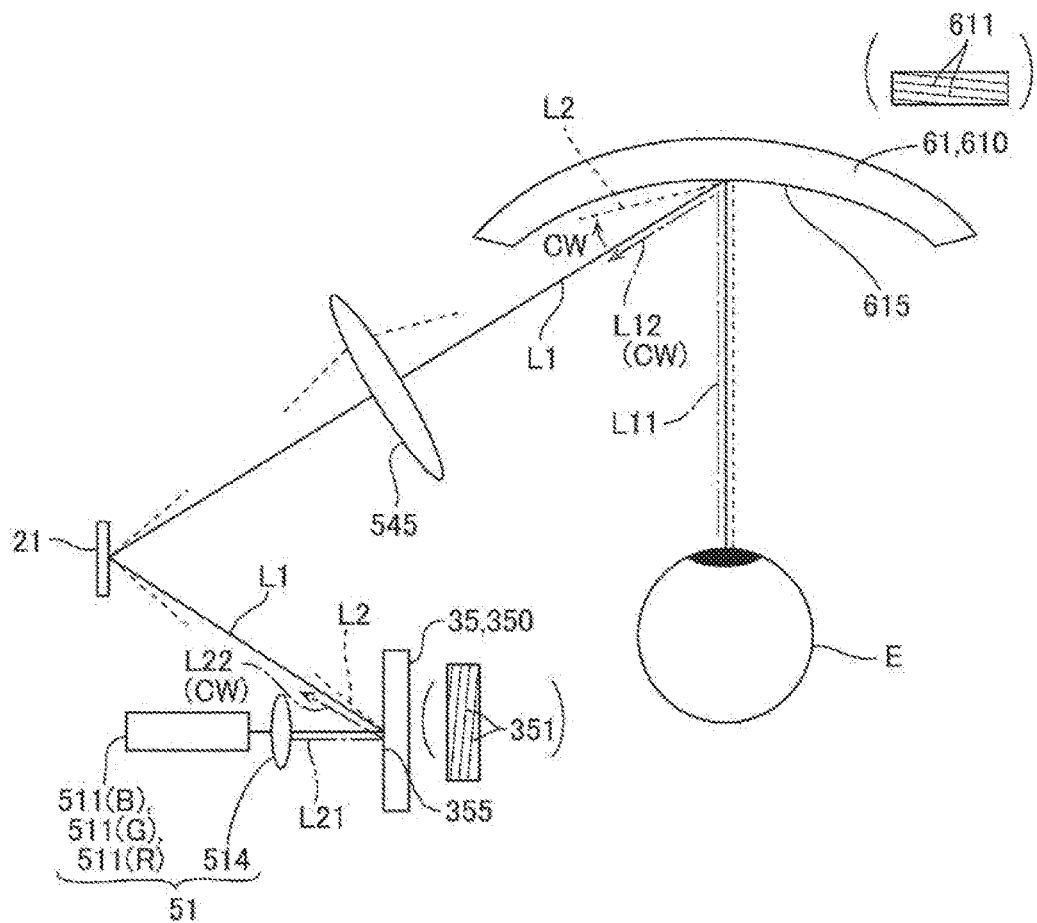
FIG. 5 illustrates a first diffraction element and a second diffraction element used in a display device according to a first embodiment.
Figure 6:
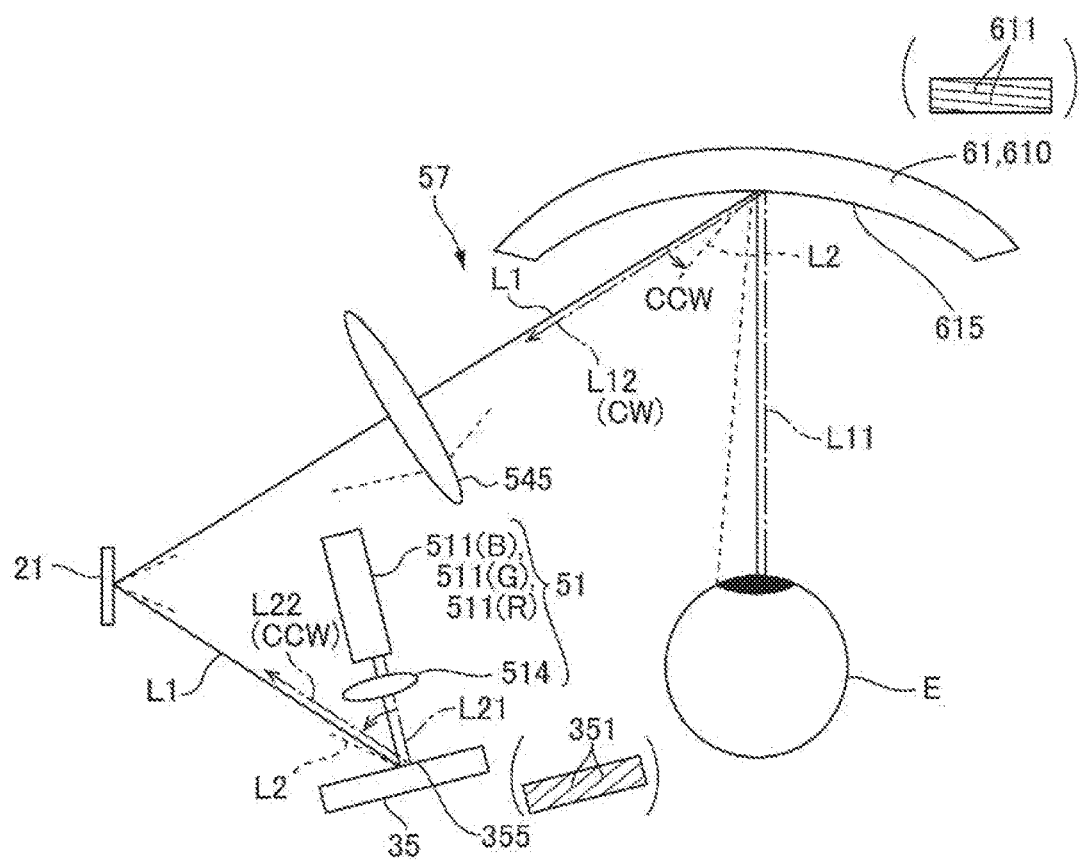
FIG. 6 illustrates a first diffraction element and a second diffraction element used in a display device according to a first comparative example of the embodiment.
Figure 7:
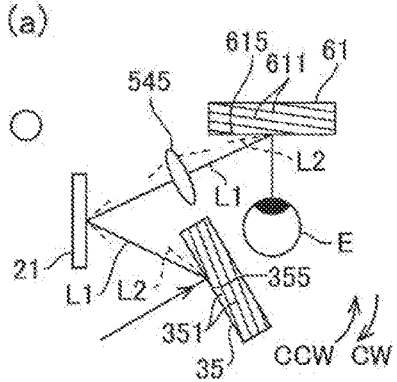
FIG. 7 illustrates light beams in a light guide device according to the first embodiment and the first comparative example of the embodiment.

FIG. 5 illustrates the first diffraction element 61 and the second diffraction element 35 in the display device 100 according to the first embodiment. FIG. 6 illustrates the first diffraction element 61 and the second diffraction element 35 in the display device 100 according to a first comparative example of the embodiment. FIG. 7 illustrates light beams in the light guide device 57 according to the first embodiment and the first comparative example of the embodiment. In FIG. 7, the first diffraction element 61 is illustrated as a flat-shaped element. In FIGS. 5, 6, and 7, light beams of wavelengths optimum for the interference fringe pitches in the first diffraction element 61 and the second diffraction element 35 are indicated by solid lines, and light beams of wavelengths varied to longer wavelengths than the optimum wavelengths are indicated by dotted lines. Furthermore, FIGS. 5, 6, and 7 schematically illustrate the inclination directions of the interference fringes 351 and 611.

As illustrated in FIG. 5, in this embodiment, the structures of the first diffraction element 61 and the second diffraction element 35 are optimized depending on the structures of the light guide device 57 and the like illustrated in FIG. 2. More specifically, in this embodiment, the sum of the number of reflections of the light and the numbers of times of intermediate image generation is an even number between the second diffraction element 35 and the first diffraction element 61. Accordingly, the second diffraction element 35 and the first diffraction element 61 are set such that when viewed from direction of normal to virtual plane that include a direction of a normal to a first incident plane 615 that is an incident plane of the first diffraction element 61 and a direction of a normal to a second incident plane 355 that is an incident plane of the second diffraction element 35, the directions in which diffraction light beams that have the highest diffraction efficiencies are output when light enters from the direction of the normal to the first incident plane 615 and the direction of the normal to the second incident plane 355 are the same side with respect to the directions of the normals to the incident planes.

More specifically, as illustrated in FIG. 5, according to the first embodiment, the scanning mirror 21 and an intermediate image generation lens 545 are disposed between the second diffraction element 35 and the first diffraction element 61, and between the second diffraction element 35 and the first diffraction element 61, the reflection by the scanning mirror 21 and the generation of an intermediate image by the intermediate image generation lens 545 are performed. Accordingly, the sum of the number of reflections and the number of times of generation of intermediate image between the second diffraction element 35 and the first diffraction element 61 is two (even number).

Consequently, if a first direction is the direction in which the light having highest diffraction efficiency is output when light enters from a direction of a normal to the first incident plane 615 and a second direction is the direction in which the light having highest diffraction efficiency is output when light enters from a direction of a normal to the second incident plane 355, when viewed from the direction of the normal to the virtual plane, the direction of the first direction with respect to the direction of the normal to the first incident plane 615 and the direction of the second direction with respect to the direction of the normal to the second incident plane 355 are the same.

More specifically, as indicated by the alternate long and short dashed line L11 in FIG. 5, when a light beam enters from a direction of a normal to the first incident plane 615 of the first diffraction element 61, the first direction in which diffraction light (alternate long and short dashed line L12) that has highest diffraction efficiency is output is on a clockwise CW side with respect to the direction of the normal to the first incident plane 615. As indicated by the alternate long and short dashed line L21 in FIG. 5, when a light beam enters from a direction of a normal to the second incident plane 355 of the second diffraction element 35, the second direction in which diffraction light (alternate long and short dashed line L22) that has highest diffraction efficiency is output is on the clockwise CW side with respect to the direction of the normal to the second incident plane 355, the same side as in the first diffraction element 61. Such a structure is implemented by providing the interference fringes 611 and the interference fringes 351 such that the inclination direction of the interference fringes 611 and the inclination direction of the interference fringes 351 are the same, the inclination directions have been described with reference to FIG. 3.

In this structure, as illustrated in FIG. 5 and FIG. 7(a), with respect to a case where a light beam (solid line L1) of an optimum wavelength enters from a direction of a normal to the second incident plane 355 of the second diffraction element 35, a diffraction light (dotted line L2) produced when a light beam of a wavelength longer than the optimum wavelength enters is inclined toward the clockwise CW side. Accordingly, when light enters the first incident plane 615 of the first diffraction element 61 via the scanning mirror 21 and the intermediate image generation lens 545, the diffraction light of the light beam that has the wavelength longer than the optimum wavelength enters from the side inclined toward the clockwise CW side compared to the light beam of the optimum wavelength. Consequently, the light beam of the optimum wavelength and the light beam of the wavelength longer than the optimum wavelength are output toward the same direction from the first diffraction element 61, and thereby the decrease in resolution can be reduced. According to the embodiment, for example, image displacement due to variations in the wavelengths can be reduced to about one pixel or less.

In contrast, if a structure according to a first comparative example illustrated in FIG. 6 is used when the sum of the number of reflections and the number of times of intermediate image generation between the second diffraction element 35 and the first diffraction element 61 is two (even number), the light beam of an optimum wavelength and the light beam of a wavelength longer than the optimum wavelength are output toward different directions from the first diffraction element 61, and thereby the resolution is largely decreased. That is, in the first comparative example illustrated in FIG. 6, as indicated by the alternate long and short dashed line L11 in FIG. 6, when a light beam enters from a direction of a normal to the first incident plane 615 of the first diffraction element 61, the first direction in which diffraction light (alternate long and short dashed line L12) that has highest diffraction efficiency is output is on the clockwise CW side with respect to the direction of the normal to the first incident plane 615. In contrast, as indicated by the alternate long and short dashed line L21 in FIG. 6, when a light beam enters from a direction of a normal to the second diffraction element 35, a location where diffraction light (alternate long and short dashed line L22) that has highest diffraction efficiency is output is on the counter-clockwise CCW side with respect to the direction of the normal to the second incident plane 355, the opposite side as in the first diffraction element 61.

In this structure, as illustrated in FIG. 6 and FIG. 7(c), with respect to a case where a light beam (solid line L1) of an optimum wavelength enters from a direction of a normal to the second incident plane 355 of the second diffraction element 35, a diffraction light (dotted line L2) produced when a light beam of a wavelength longer than the optimum wavelength enters is inclined toward the counterclockwise CCW side. Accordingly, when the diffraction light of the light beam of the wavelength longer than the optimum wavelength enters the first incident plane 615 of the first diffraction element 61 via the scanning mirror 21 and the intermediate image generation lens 545, the diffraction light enters from the side inclined toward the counterclockwise CCW side compared to the light beam of the optimum wavelength. Consequently, the light beam of the optimum wavelength and the light beam of the wavelength longer than the optimum wavelength are output toward the different directions from the first diffraction element 61, and thereby the resolution can be largely decreased. Accordingly, for example, image displacement of about 10 pixels may occur due to variations in the wavelengths.

FIG. 7(b) illustrates a light beam that enters from an oblique direction toward the second incident plane 355 of the second diffraction element 35 according to the first embodiment. In this case, similarly to the case described with reference to FIG. 5, with respect to a case where a beam of light (solid line L1) of an optimum wavelength enters, a diffraction light (dotted line L2) produced when a light beam of a wavelength longer than the optimum wavelength enters is inclined toward the clockwise CW side. Accordingly, when light enters the first incident plane 615 of the first diffraction element 61 via the scanning mirror 21 and the intermediate image generation lens 545, the diffraction light of the light beam that has the wavelength longer than the optimum wavelength enters from the side inclined toward the clockwise CW side compared to the light beam of the optimum wavelength. Consequently, the light beam of the optimum wavelength and the light beam of the wavelength longer than the optimum wavelength are output toward the same direction from the first diffraction element 61, and thereby the decrease in resolution can be reduced.

FIG. 7(d) illustrates a light beam that enters from an oblique direction toward the second incident plane 355 of the second diffraction element 35 according to the first comparative example. In this case, similarly to the case described with reference to FIG. 6, with respect to a case where a beam of light (solid line L1) of an optimum wavelength enters, a diffraction light (dotted line L2) produced when a light beam of a wavelength longer than the optimum wavelength enters is inclined toward the counterclockwise CCW side. Accordingly, the diffraction light of the light beam of the wavelength longer than the optimum wavelength enters from the side inclined toward the counterclockwise CCW side compared to the light beam of the optimum wavelength, when the diffraction light enters the first incident plane 615 of the first diffraction element 61 via the scanning mirror 21 and the intermediate image generation lens 545. Consequently, the light beam of the optimum wavelength and the light beam of the wavelength longer than the optimum wavelength are output toward the different directions from the first diffraction element 61, and thereby the resolution may be largely decreased.

First Modification of the First Embodiment

Figure 8:
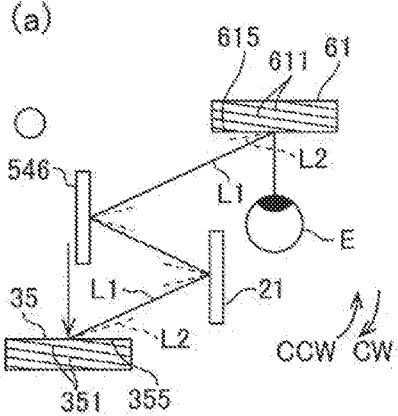
FIG. 8 illustrates light beams in a light guide device according to a first modification of the first embodiment and a first modification of the first comparative example of the embodiment.

FIG. 8 illustrates light beams in the light guide device 57 according to a first modification of the first embodiment and a first modification of the first comparative example of the embodiment. In FIG. 8, the first diffraction element 61 is illustrated as a flat-shaped element. In FIG. 8, light beams of wavelengths optimum for the interference fringe pitches in the first diffraction element 61 and the second diffraction element 35 are indicated by solid lines, and light beams of wavelengths varied to longer wavelengths than the optimum wavelengths are indicated by dotted lines. Furthermore, FIG. 8 schematically illustrates the inclination directions of the interference fringes 351 and 611.

FIG. 8 illustrates light beams in the light guide device 57 according to the first modification of the first embodiment and the first modification of the first comparative example of the embodiment when the sum of the number of reflections and the number of times of intermediate image generation between the second diffraction element 35 and the first diffraction element 61 is two (even number). That is, in the first modification of the first embodiment, the intermediate image generation lens 545 is not provided, and between the second diffraction element 35 and the first diffraction element 61, the reflection by the scanning mirror 21 and the reflection by a mirror 546 are performed. Accordingly, the sum of the number of reflections and the number of times of intermediate image generation between the second diffraction element 35 and the first diffraction element 61 is two (even number).

In this structure, according to the first modification of the first embodiment, as illustrated in FIG. 8(a), with respect to a case where the light beam (solid line L1) of an optimum wavelength enters from a direction of a normal to the second incident plane 355 of the second diffraction element 35, a diffraction light (dotted line L2) produced when a light beam of a wavelength longer than the optimum wavelength enters is inclined toward the clockwise CW side. Accordingly, when light enters the first incident plane 615 of the first diffraction element 61 via the scanning mirror 21 and the mirror 546, the diffraction light of the light beam that has the wavelength longer than the optimum wavelength enters from the side inclined toward the clockwise CW side compared to the light beam of the optimum wavelength. Consequently, the light beam of the optimum wavelength and the light beam of the wavelength longer than the optimum wavelength are output toward the same direction from the first diffraction element 61, and thereby the decrease in resolution can be reduced.

According to the first modification of the first embodiment, as illustrated in FIG. 8(b), with respect to a case where the light beam (solid line L1) of an optimum wavelength enters from an oblique direction to the second incident plane 355 of the second diffraction element 35, a diffraction light (dotted line L2) produced when a light beam of a wavelength longer than the optimum wavelength enters is inclined toward the clockwise CW side. Accordingly, when light enters the first incident plane 615 of the first diffraction element 61 via the scanning mirror 21 and the mirror 546, the diffraction light of the light beam that has the wavelength longer than the optimum wavelength enters from the side inclined toward the clockwise CW side compared to the light beam of the optimum wavelength. Consequently, the light beam of the optimum wavelength and the light beam of the wavelength longer than the optimum wavelength are output toward the same direction from the first diffraction element 61, and thereby the decrease in resolution can be reduced.

In contrast, according to the first modification of the first comparative example, as illustrated in FIG. 8(c), with respect to a case where the light beam (solid line L1) of the optimum wavelength enters from a direction of a normal to the second incident plane 355 of the second diffraction element 35, a diffraction light (dotted line L2) produced when a light beam of a wavelength longer than the optimum wavelength enters is inclined toward the counterclockwise CCW side. Accordingly, when light enters the first incident plane 615 of the first diffraction element 61 via the scanning mirror 21 and the mirror 546, the diffraction light of the light beam that has the wavelength longer than the optimum wavelength enters from the side inclined toward the counterclockwise CCW side compared to the light beam of the optimum wavelength. Consequently, the light beam of the optimum wavelength and the light beam of the wavelength longer than the optimum wavelength are output toward the different directions from the first diffraction element 61, and thereby the resolution may be largely decreased.

According to the first modification of the first comparative example, as illustrated in FIG. 8(d), with respect to a case where a light beam (solid line L1) of an optimum wavelength enters the second incident plane 355 of the second diffraction element 35 from an oblique direction, a diffraction light (dotted line L2) produced when a light beam of a wavelength longer than the optimum wavelength enters is inclined toward the counterclockwise CCW side. Accordingly, when light enters the first incident plane 615 of the first diffraction element 61 via the scanning mirror 21 and the mirror 546, the diffraction light of the light beam that has the wavelength longer than the optimum wavelength enters from the side inclined toward the counterclockwise CCW side compared to the light beam of the optimum wavelength. Consequently, the light beam of the optimum wavelength and the light beam of the wavelength longer than the optimum wavelength are output toward the different directions from the first diffraction element 61, and thereby the resolution may be largely decreased.

Second Modification of the First Embodiment

Figure 9:
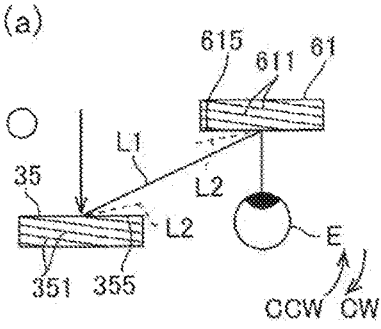
FIG. 9 illustrates light beams in a light guide device according to a second modification of the first embodiment and a second modification of the first comparative example of the embodiment.

FIG. 9 illustrates light beams in the light guide device 57 according to a second modification of the first embodiment and a second modification of the first comparative example of the embodiment. In FIG. 9, the first diffraction element 61 is illustrated as a flat-shaped element. In FIG. 9, light beams of wavelengths optimum for the interference fringe pitches in the first diffraction element 61 and the second diffraction element 35 are indicated by solid lines, and light beams of wavelengths varied to longer wavelengths than the optimum wavelengths are indicated by dotted lines. Furthermore, FIG. 9 schematically illustrates the inclination directions of the interference fringes 351 and 611.

FIG. 9 illustrates light beams in the light guide device 57 according to the second modification of the first embodiment and the second modification of the first comparative example of the embodiment when the sum of the number of reflections and the number of times of intermediate image generation between the second diffraction element 35 and the first diffraction element 61 is zero (even number). That is, in the second modification of the first embodiment and the second modification of the first comparative example of the embodiment, between the second diffraction element 35 and the first diffraction element 61, the scanning mirror 21 and the intermediate image generation lens 545 are not provided. Accordingly, the sum of the number of reflections and the number of times of intermediate image generation between the second diffraction element 35 and the first diffraction element 61 is zero (even number).

In this structure, according to the second modification of the first embodiment, as illustrated in FIG. 9(a), with respect to a case where a light beam (solid line L1) of an optimum wavelength enters from a direction of a normal to the second incident plane 355 of the second diffraction element 35, a diffraction light (dotted line L2) produced when a light beam of a wavelength longer than the optimum wavelength enters inclines toward the clockwise CW side. Accordingly, when light enters the first incident plane 615 of the first diffraction element 61, the diffraction light of the light beam that has the wavelength longer than the optimum wavelength enters from the side inclined toward the clockwise CW side compared to the light beam of the optimum wavelength. Consequently, the light beam of the optimum wavelength and the light beam of the wavelength longer than the optimum wavelength are output toward the same direction from the first diffraction element 61, and thereby the decrease in resolution can be reduced.

According to the second modification of the first embodiment, as illustrated in FIG. 9(b), with respect to a case where a light beam (solid line L1) of an optimum wavelength enters the second incident plane 355 of the second diffraction element 35 from an oblique direction, a diffraction light (dotted line L2) produced when a light beam of a wavelength longer than the optimum wavelength enters is inclined toward the clockwise CW side. Accordingly, when light enters the first incident plane 615 of the first diffraction element 61, the diffraction light of the light beam that has the wavelength longer than the optimum wavelength enters from the side inclined toward the clockwise CW side compared to the light beam of the optimum wavelength. Consequently, the light beam of the optimum wavelength and the light beam of the wavelength longer than the optimum wavelength are output toward the same direction from the first diffraction element 61, and thereby the decrease in resolution can be reduced.

In contrast, according to the second modification of the first comparative example, as illustrated in FIG. 9(c), with respect to a case where a light beam (solid line L1) of an optimum wavelength enters from a direction of a normal to the second incident plane 355 of the second diffraction element 35, a diffraction light (dotted line L2) produced when a light beam of a wavelength longer than the optimum wavelength enters is inclined toward the counterclockwise CCW side. Accordingly, when light enters the first incident plane 615 of the first diffraction element 61, the diffraction light of the light beam that has the wavelength longer than the optimum wavelength enters from the side inclined toward the counterclockwise CCW side compared to the light beam of the optimum wavelength. Consequently, the light beam of the optimum wavelength and the light beam of the wavelength longer than the optimum wavelength are output toward the different directions from the first diffraction element 61, and thereby the resolution may be largely decreased.

According to the second modification of the first comparative example, as illustrated in FIG. 9(d), with respect a case where a light beam (solid line L1) of an optimum wavelength enters the second incident plane 355 of the second diffraction element 35 from an oblique direction, a diffraction light (dotted line L2) produced when a light beam of a wavelength longer than the optimum wavelength enters is inclined toward the counterclockwise CCW side. Accordingly, when light enters the first incident plane 615 of the first diffraction element 61, the diffraction light of the light beam that has the wavelength longer than the optimum wavelength enters from the side inclined toward the counterclockwise CCW side compared to the light beam of the optimum wavelength. Consequently, the light beam of the optimum wavelength and the light beam of the wavelength longer than the optimum wavelength are output toward the different directions from the first diffraction element 61, and thereby the resolution may be largely decreased.

Second Embodiment of the Light Guide Device 57

Figure 10:
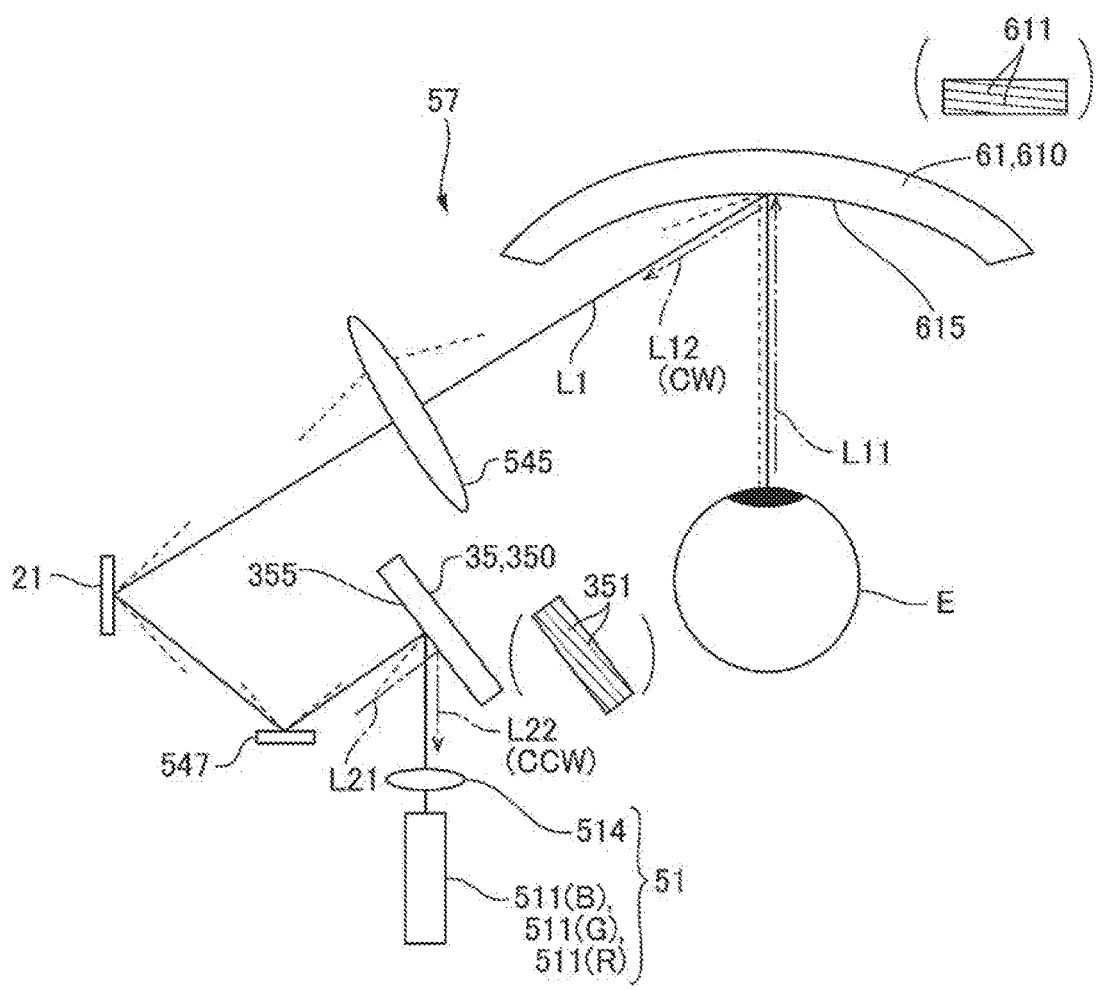
FIG. 10 illustrates a first diffraction element and a second diffraction element used in a display device according to a second embodiment.
Figure 11:
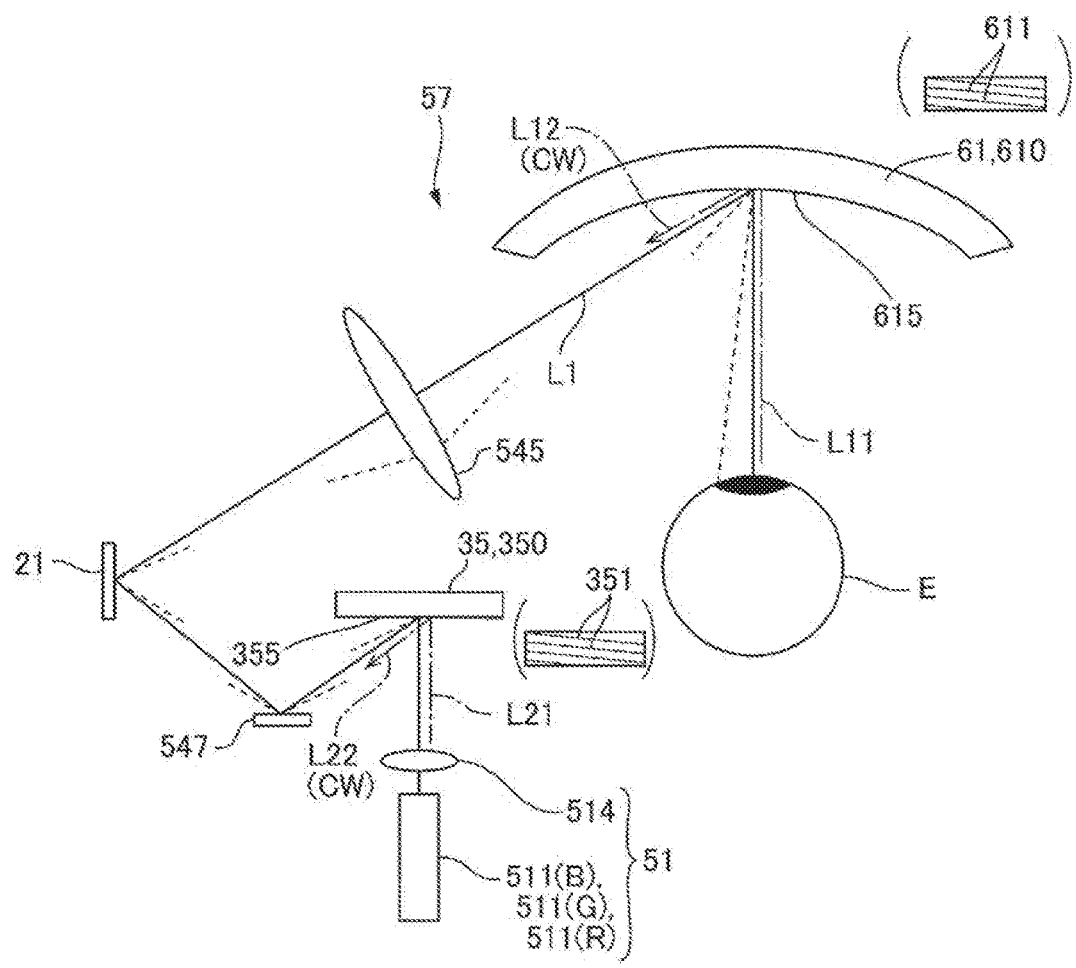
FIG. 11 illustrates a first diffraction element and a second diffraction element used in a display device according to a second comparative example of the embodiment.

FIG. 10 illustrates the first diffraction element 61 and the second diffraction element 35 in the display device 100 according to a second embodiment. FIG. 11 illustrates the first diffraction element 61 and the second diffraction element 35 in the display device 100 according to a second comparative example of the embodiment. FIG. 12 illustrates light beams in the light guide device 57 according to the second embodiment and the second comparative example of the embodiment. In FIG. 12, the first diffraction element 61 is illustrated as a flat-shaped element. In FIG. 11, the mirror 547 and the intermediate image generation lens 545 are omitted so as to simplify the sum of the number of reflections and the number of the times of intermediate image generation to one. In FIGS. 10, 11, and 12, light beams of wavelengths optimum for the interference fringe pitches in the first diffraction element 61 and the second diffraction element 35 are indicated by solid lines, and light beams of wavelengths varied to longer wavelengths than the optimum wavelengths are indicated by dotted lines. Furthermore, FIGS. 10, 11, and 12 schematically illustrate the inclination directions of the interference fringes 351 and 611.

As illustrated in FIG. 10, in the second embodiment and the second comparative example, similarly to the first embodiment, the structures of the first diffraction element 61 and the second diffraction element 35 are optimized depending on the structure of the light guide device 57 and the like illustrated in FIG. 2. More specifically, in the second embodiment and the second comparative example, the sum of the number of reflections of the light and the number of times of intermediate image generation between the second diffraction element 35 and the first diffraction element 61 is an odd number. Accordingly, the second diffraction element 35 and the first diffraction element 61 are set such that when viewed from direction of normal to virtual plane that include a direction of a normal to the first incident plane 615 of the first diffraction element 61 and a direction of a normal to the second incident plane 355 of the second diffraction element 35, the directions in which diffraction light beams that have the highest diffraction efficiencies are output when light enters from the direction of the normal to the first incident plane 615 and the direction of the normal to the second incident plane 355 are the opposite sides with respect to the directions of the normals to the incident planes.

More specifically, as illustrated in FIG. 10, according to the second embodiment, a mirror 547, the scanning mirror 21, and the intermediate image generation lens 545 are disposed between the second diffraction element 35 and the first diffraction element 61, and between the second diffraction element 35 and the first diffraction element 61, the reflection by the mirror 547, the reflection by the scanning mirror 21, and the generation of an intermediate image by the intermediate image generation lens 545 are performed. Accordingly, the sum of the number of reflections and the number of times of intermediate image generation between the second diffraction element 35 and the first diffraction element 61 is three (odd number).

Consequently, if a first direction is the direction in which the light having highest diffraction efficiency is output when light enters from a direction of a normal to the first incident plane 615 and a second direction is the direction in which the light having highest diffraction efficiency is output when light enters from a direction of a normal to the second incident plane 355, when viewed from the direction of the normal to the virtual plane, the direction of the first direction with respect to the direction of the normal to the first incident plane 615 and the direction of the second direction with respect to the direction of the normal to the second incident plane 355 are opposite to each other.

For example, as indicated by the alternate long and short dashed line L11 in FIG. 10, when a light beam enters from a direction of a normal to the first incident plane 615 of the first diffraction element 61, the first direction in which diffraction light (alternate long and short dashed line L12) that has highest diffraction efficiency is output is on the clockwise CW side with respect to the direction of the normal to the first incident plane 615. Furthermore, as indicated by the alternate long and short dashed line L21 in FIG. 10, when a light beam enters from a direction of a normal to the second incident plane 355 of the second diffraction element 35, the second direction in which diffraction light (alternate long and short dashed line L22) that has highest diffraction efficiency is output is on the counterclockwise CCW side with respect to the direction of the normal to the second incident plane 355, the opposite side as in the first diffraction element 61. Such a structure is implemented by providing the interference fringes 611 and the interference fringes 351 such that the inclination direction of the interference fringes 611 and the inclination direction of the interference fringes 351 are opposite each other, the inclination directions have been described with reference to FIG. 3.

In this structure, as illustrated in FIG. 10 and FIG. 12(a), with respect to a case where a light beam (solid line L1) of an optimum wavelength enters from a direction of a normal to the second incident plane 355 of the second diffraction element 35, a diffraction light (dotted line L2) produced when a light beam of a wavelength longer than the optimum wavelength enters is inclined toward the counterclockwise CCW side. Accordingly, when light enters the first incident plane 615 of the first diffraction element 61 via the mirror 547, the scanning mirror 21, and the intermediate image generation lens 545, the diffraction light of the light beam that has the wavelength longer than the optimum wavelength enters from the side inclined toward the clockwise CW side compared to the light beam of the optimum wavelength. Consequently, the light beam of the optimum wavelength and the light beam of the wavelength longer than the optimum wavelength are output toward the same direction from the first diffraction element 61, and thereby the decrease in resolution can be reduced.

In contrast, if a structure according to the second comparative example illustrated in FIG. 11 is used when the sum of the number of reflections and the number of times of intermediate image generation between the second diffraction element 35 and the first diffraction element 61 is three (odd number), the light beam of an optimum wavelength and the light beam of a wavelength longer than the optimum wavelength are output toward different directions from the first diffraction element 61, and thereby the resolution may largely decreased. That is, in the second comparative example illustrated in FIG. 11, as indicated by the alternate long and short dashed line L11 in FIG. 11, when a light beam enters from a direction of a normal to the first incident plane 615 of the first diffraction element 61, the first direction in which diffraction light (alternate long and short dashed line L12) that has highest diffraction efficiency is output is on the clockwise CW side with respect to the direction of the normal to the first incident plane 615. Furthermore, as indicated by the alternate long and short dashed line L21 in FIG. 11, when a light beam enters from a direction of a normal to the second incident plane 355 of the second diffraction element 35, the location toward which diffraction light (alternate long and short dashed line L22) that has highest diffraction efficiency is output is on the clockwise CW side with respect to the direction of the normal to the second incident plane 355, the same side as in the first diffraction element 61.

In this structure, as illustrated in FIG. 11 and FIG. 12(c), with respect to a case where a light beam (solid line L1) of an optimum wavelength enters from a direction of a normal to the second incident plane 355 of the second diffraction element 35, a diffraction light (dotted line L2) produced when a light beam of a wavelength longer than the optimum wavelength enters is inclined toward the clockwise CW side. Accordingly, when light enters the first incident plane 615 of the first diffraction element 61 via the mirror 547, the scanning mirror 21, and the intermediate image generation lens 545, the diffraction light of the light beam that has the wavelength longer than the optimum wavelength enters from the side inclined toward the counterclockwise CCW side compared to the light beam of the optimum wavelength. Consequently, the light beam of the optimum wavelength and the light beam of the wavelength longer than the optimum wavelength are output toward the different directions from the first diffraction element 61, and thereby the resolution may be largely decreased.

FIG. 12(b) illustrates a light beam that enters the second incident plane 355 of the second diffraction element 35 from an oblique direction according to the second embodiment. In this case, similarly to the case described with reference to FIG. 10, with respect to a case where a beam of light (solid line L1) of an optimum wavelength enters, a diffraction light (dotted line L2) produced when a light beam of a wavelength longer than the optimum wavelength enters is inclined toward the counterclockwise CCW side. Accordingly, when light enters the first incident plane 615 of the first diffraction element 61 via the mirror 547, the scanning mirror 21, and the intermediate image generation lens 545, the diffraction light of the light beam that has the wavelength longer than the optimum wavelength enters from the side inclined toward the clockwise CW side compared to the light beam of the optimum wavelength. Consequently, the light beam of the optimum wavelength and the light beam of the wavelength longer than the optimum wavelength are output toward the same direction from the first diffraction element 61, and thereby the decrease in resolution can be reduced.

FIG. 12(d) illustrates a light beam that enters the second incident plane 355 of the second diffraction element 35 from an oblique direction according to the second comparative example. In this case, similarly to the case described with reference to FIG. 11, with respect to a case where a beam of light (solid line L1) of an optimum wavelength enters, a diffraction light (dotted line L2) produced when a light beam of a wavelength longer than the optimum wavelength enters is inclined toward the clockwise CW side. Accordingly, when light enters the first incident plane 615 of the first diffraction element 61 via the mirror 547, the scanning mirror 21, and the intermediate image generation lens 545, the diffraction light of the light beam that has the wavelength longer than the optimum wavelength enters from the side inclined toward the counterclockwise CCW side compared to the light beam of the optimum wavelength. Consequently, the light beam of the optimum wavelength and the light beam of the wavelength longer than the optimum wavelength are output toward the different directions from the first diffraction element 61, and thereby the resolution may be largely decreased.

Other Embodiments

Although the image light generation device 70 includes the light source section 51 and the scanning optical system 20 in the above-described embodiments, according to another embodiment, a display device that generates image light with a display panel such as a liquid crystal panel, an organic electroluminescence display panel, or a display panel that uses a micromirror may be employed. In the above-described embodiments, a transmissive volume holographic element or a blazed diffraction element may be used as one of or both of the first diffraction element 61 and the second diffraction element 35.

The entire disclosure of Japanese Patent Application No. 2016-049266, filed Mar. 14, 2016 is expressly incorporated by reference herein.

What is claimed is:
1. A display device comprising:
an image light generation device configured to output an image light;
a first diffraction element configured to diffract the image light that has entered a first incident plane such that the image light is directed to an eye of an observer; and
a second diffraction element disposed on an optical path between the image light generation device and the first diffraction element, the second diffraction element being configured to diffract the image light that has entered a second incident plane such that the image light is directed to the first diffraction element,
wherein the first diffraction element has highest diffraction efficiency in a first direction when light enters from a direction of a normal to the first incident plane,
the second diffraction element has highest diffraction efficiency in a second direction when light enters from a direction of a normal to the second incident plane,
the first diffraction element and the second diffraction element are disposed such that, if the sum of the number of reflections of light and the number of times of intermediate image generation between the second diffraction element and the first diffraction element is an even number, when viewed from direction of normal to virtual plane that include a normal to the first incident plane and a normal to the second incident plane, the direction of the first direction with respect to the direction of the normal to the first incident plane and the direction of the second direction with respect to the direction of the normal to the second incident plane are the same as each other, and
the first diffraction element and the second diffraction element are disposed such that, if the sum of the number of reflections of light and the number of times of intermediate image generation between the second diffraction element and the first diffraction element is an odd number, when viewed from the direction of the normal to the virtual plane that include the normal to the first incident plane and the normal to the second incident plane, the direction of the first direction with respect to the direction of the normal to the first incident plane and the direction of the second direction with respect to the direction of the normal to the second incident plane are different from each other.

2. The display device according to claim 1, wherein the first diffraction element and the second diffraction element are reflective holographic elements.

3. The display device according to claim 2, wherein the first diffraction element and the second diffraction element are reflective volume holographic elements.

4. The display device according to claim 2, wherein the first diffraction element and the second diffraction element have a plurality of interference fringes linearly extending parallel to each other.

5. The display device according to claim 2, wherein the first diffraction element and the second diffraction element have a plurality of curved interference fringes extending parallel to each other.

6. The display device according to claim 2, wherein the first diffraction element and the second diffraction element have a plurality of kinds of interference fringes of different pitches.

7. A light guide device comprising:
a first diffraction element configured to diffract a light that has been emitted from a light source and that has entered a first incident plane; and
a second diffraction element disposed on an optical path between the light source and the first diffraction element, the second diffraction element being configured to diffract the light that has entered a second incident plane such that the image light is directed to the first diffraction element,
wherein the first diffraction element has highest diffraction efficiency in a first direction when light enters from a direction of a normal to the first incident plane,
the second diffraction element has highest diffraction efficiency in a second direction when light enters from a direction of a normal to the second incident plane,
the first diffraction element and the second diffraction element are disposed such that, if the sum of the number of reflections of light and the number of times of intermediate image generation between the second diffraction element and the first diffraction element is an even number, when viewed from direction of normal to virtual plane that include a normal to the first incident plane and a normal to the second incident plane, the direction of the first direction with respect to the direction of the normal to the first incident plane and the direction of the second direction with respect to the direction of the normal to the second incident plane are the same as each other, and
the first diffraction element and the second diffraction element are disposed such that, if the sum of the number of reflections of light and the number of times of intermediate image generation between the second diffraction element and the first diffraction element is an odd number, when viewed from the direction of the normal to the virtual plane that include the normal to the first incident plane and the normal to the second incident plane, the direction of the first direction with respect to the direction of the normal to the first incident plane and the direction of the second direction with respect to the direction of the normal to the second incident plane are different from each other.

8. The light guide device according to claim 7, wherein the first diffraction element and the second diffraction element are reflective holographic elements.

9. The light guide device according to claim 8, wherein the first diffraction element and the second diffraction element are reflective volume holographic elements.

* * * * *